(12) United States Patent
Morita et al.

(10) Patent No.: US 11,695,309 B2
(45) Date of Patent: Jul. 4, 2023

(54) COIL SUBSTRATE AND MOTOR COIL SUBSTRATE

(71) Applicant: IBIDEN CO., LTD., Gifu (JP)

(72) Inventors: Haruhiko Morita, Ogaki (JP); Hitoshi Miwa, Ogaki (JP); Shinobu Kato, Ogaki (JP); Toshihiko Yokomaku, Ogaki (JP); Hisashi Kato, Ogaki (JP); Takahisa Hirasawa, Ogaki (JP); Tetsuya Muraki, Ogaki (JP); Takayuki Furuno, Ogaki (JP)

(73) Assignee: IBIDEN CO., LTD., Ogaki (JP)

( * ) Notice: Subject to any disclaimer, the term of this patent is extended or adjusted under 35 U.S.C. 154(b) by 0 days.

(21) Appl. No.: 17/386,957

(22) Filed: Jul. 28, 2021

(65) Prior Publication Data

US 2022/0060074 A1 Feb. 24, 2022

(30) Foreign Application Priority Data

Aug. 24, 2020 (JP) ................................ 2020-141001

(51) Int. Cl.
*H02K 3/26* (2006.01)
(52) U.S. Cl.
CPC ........... *H02K 3/26* (2013.01); *H02K 2203/03* (2013.01)

(58) Field of Classification Search
CPC .. H02K 3/00; H02K 3/26; H02K 3/28; H02K 3/47; H01F 5/00; H01F 5/04; H01F 27/00; H01F 27/28; H05K 1/00; H05K 1/02; H05K 1/16
See application file for complete search history.

(56) References Cited

U.S. PATENT DOCUMENTS

| 4,665,331 A * | 5/1987 | Sudo ........................ H02K 3/26 |
| | | 310/40 MM |
| 2009/0072651 A1* | 3/2009 | Yan ..................... H02K 15/0407 |
| | | 336/200 |

FOREIGN PATENT DOCUMENTS

JP 2002-078264 A 3/2002

* cited by examiner

*Primary Examiner* — Tran N Nguyen
(74) *Attorney, Agent, or Firm* — Oblon, McClelland, Maier & Neustadt, L.L.P.

(57) ABSTRACT

A coil substrate includes a flexible substrate, and coils formed on the flexible substrate such that the coils are positioned substantially in a raw and that each coil has a center space and wirings surrounding the center space. The coils are formed such that each coil includes first wirings on a first surface of the flexible substrate, second wirings on a second surface of the flexible substrate on the opposite side with respect to the first surface, and via conductors penetrating through the flexible substrate and connecting the first and second wirings, and the coils are positioned such that a m-th coil has the second wirings positioned below the center space of a (m+1)-th coil and that a (m+2)-th coil has the first coils positioned on the center space of a (m+1)-th coil, where in is an integer equal to or greater than 1.

20 Claims, 3 Drawing Sheets

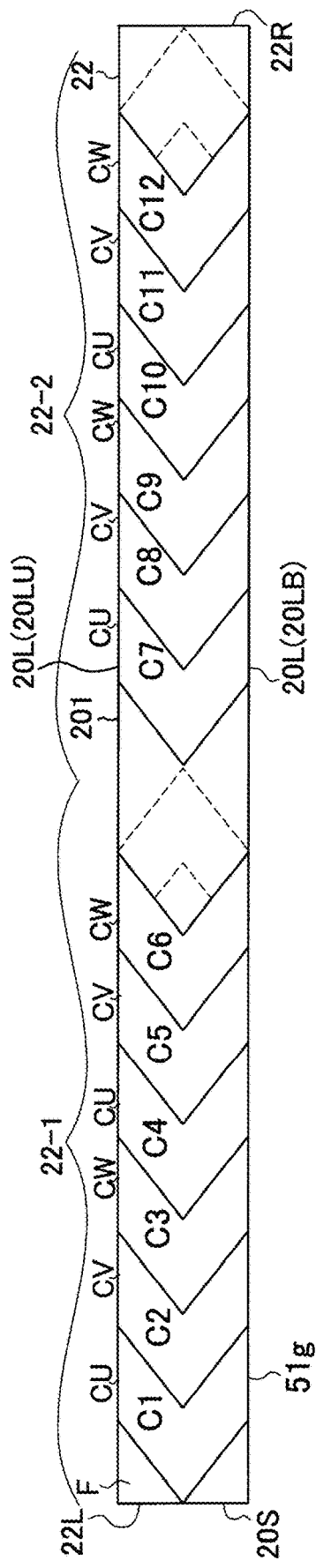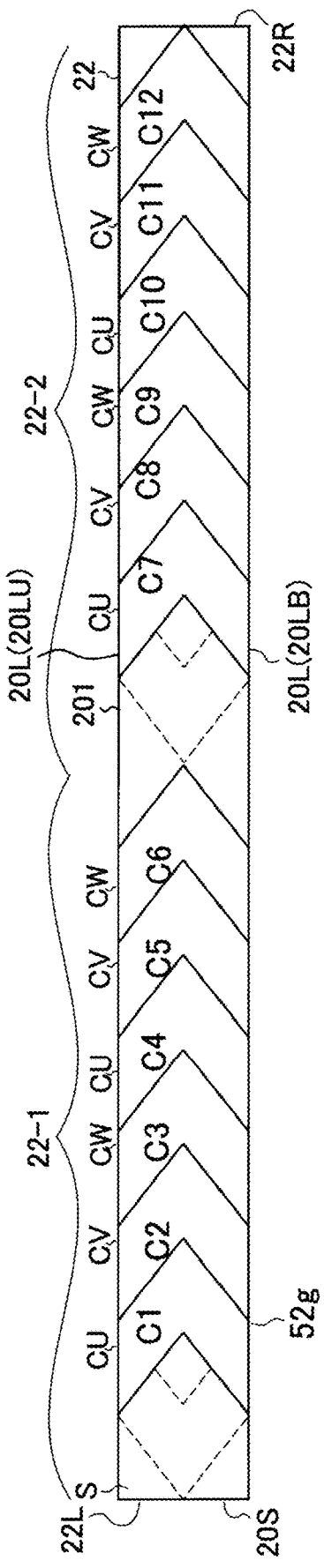

COIL SUBSTRATE AND MOTOR COIL SUBSTRATE

CROSS-REFERENCE TO RELATED APPLICATIONS

The present application is based upon and claims the benefit of priority to Japanese Patent Application No. 2020-141001, filed Aug. 24, 2020, the entire contents of which are incorporated herein by reference.

BACKGROUND OF THE INVENTION

Field of the Invention

The present invention relates to a coil substrate and a motor coil substrate.

Description of Background Art

Japanese Patent Application Laid-Open Publication No. 2002-78264 describes a stator. The entire contents of this publication are incorporated herein by reference.

SUMMARY OF THE INVENTION

According to one aspect of the present invention, a coil substrate includes a flexible substrate, and coils formed on the flexible substrate such that the coils are positioned substantially in a raw and that each of the coils has a center space and wirings surrounding the center space. The coils are formed such that each of the coils includes first wirings formed on a first surface of the flexible substrate, second wirings formed on a second surface of the flexible substrate on the opposite side with respect to the first surface, and via conductors penetrating through the flexible substrate and connecting the first wirings and the second wirings, and the coils are positioned such that a m-th coil has the second wirings positioned below the center space of a (m+1)-th coil and that a (m+2)-th coil has the first coils positioned on the center space of a (m+1)-th coil, where m is an integer equal to or greater than 1.

According to another aspect of the present invention, a coil substrate includes a flexible substrate, and coils formed on the flexible substrate such that the coils are positioned substantially in a raw and that each of the coils has a center space and wirings surrounding the center space. The coils include 2p-th coils and (2p−1)-th coils, where p is an integer equal to or greater than 1, each of the coils is formed such that the wirings in each of the (2p−1)-th coils include first wirings formed on a first surface of the flexible substrate and that the wirings in each of the 2p-th coils include second wirings formed on a second surface of the flexible substrate on the opposite side with respect to the first surface, and the coils are positioned such that the first wirings in each of the (2p−1)-th coils and the first wirings in a respective one of (2p+1)-th coils are positioned on the center space of a respective one of the 2p-th coils.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B illustrate a coil substrate according to an embodiment of the present invention;

DETAILED DESCRIPTION OF THE EMBODIMENTS

Figure 1A:
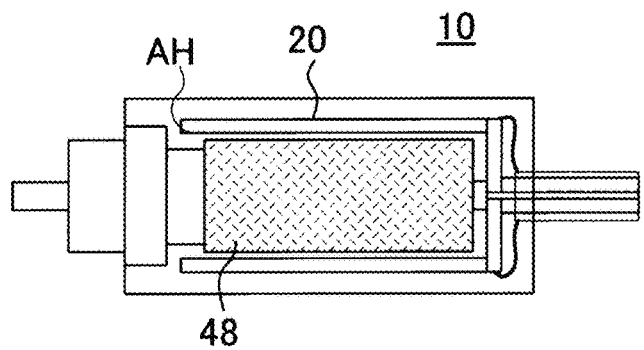
FIG. 1A is a schematic diagram of a motor according to an embodiment of the present invention.

Embodiments will now be described with reference to the accompanying drawings, wherein like reference numerals designate corresponding or identical elements throughout the various drawings.

Embodiment

A coil substrate 201 illustrated in FIGS. 2A and 2B is prepared. As illustrated in FIGS. 2A and 2B, the coil substrate 201 is formed to include: a flexible substrate 22 having a first surface (F) and a second surface (S) on an opposite side with respect to the first surface (F); and coils (C) (C1-C12) on the flexible substrate 22. FIG. 2A illustrates the coils (C) on the first surface (F), and FIG. 2B illustrates the coils (C) on the second surface (S). The coils (C) are schematically illustrated. By winding the coil substrate 201, a motor coil substrate 20 illustrated in FIG. 1B is obtained. For example, the coil substrate 201 is wound in a tubular shape. The motor coil substrate 20 is wound around a hollow space (AH). For example, the motor coil substrate 20 has a tubular shape. The number of windings (N) is 2 or more and 3 or less. FIG. 1B is a schematic diagram.

N is 2 or lamer. Therefore, as illustrated in FIG. 1B, the motor coil substrate 20 includes a first winding flexible substrate (first flexible substrate) (22-1) and a second winding flexible substrate (second flexible substrate) (22-2). The flexible substrate 22 includes the first flexible substrate (22-1) and the second flexible substrate (22-2). The first flexible substrate (22-1) includes a one-end (22L). The second flexible substrate (22-2) extends from the first flexible substrate (22-1). The second flexible substrate (22-2) is wound around an outer side of the first flexible substrate (22-1). The second flexible substrate (outer peripheral flexible substrate) (22-2) is wound around the first flexible substrate (inner peripheral flexible substrate) (22-1).

Figure 1B:
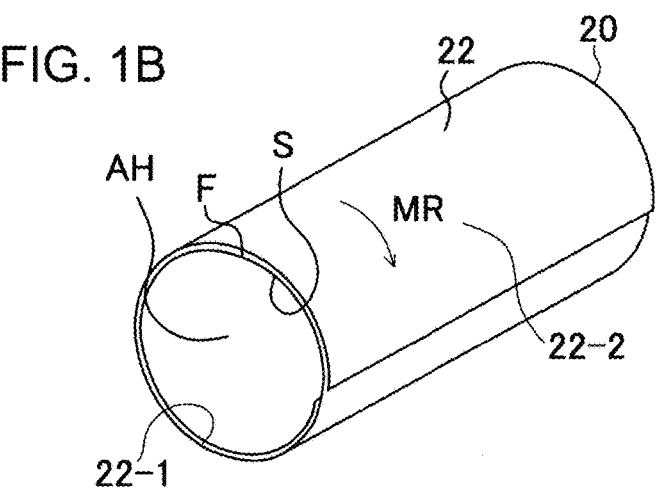
FIG. 1B is a schematic diagram of a motor coil substrate according to an embodiment of the present invention.

As illustrated in FIG. 1A, a motor 10 is obtained by positioning a magnet 48 inside the motor coil substrate 20. FIG. 1A is a schematic diagram. The motor coil substrate 20 is positioned around the magnet 48 via the hollow space (AH). An example of the motor 10 is a brushless motor. In the embodiment, the magnet 48 rotates. However, it is also possible that the motor coil substrate 20 rotates.

As illustrated in FIGS. 2A and 2B, the flexible substrate 22 preferably has short sides (20S) and long sides (20L). The flexible substrate 22 has the one-end (22L) and an other-end (22R) on an opposite side with respect to the one-end (22L). The one-end (22L) also serves as one of the short sides (20S). The long sides (20L) include an upper side (22LU) and a lower side (22LB) on an opposite side with respect to the upper side (22LU). The coils (C) (C1-C12) are formed along the long sides (20L) of the flexible substrate 22. The coils (C) are formed in one row from the one-end (22L) to the other-end (22R) of the flexible substrate 22. The number of the coils (C) is M (number (M)). The coil closest to the one-end (22L) is the first coil (C1). The coil closest to the other-end (22R) is the M-th coil (CM). The coils (C) are formed in the order from the first coil (C1) to the M-th coil (CM). In the example of FIGS. 2A and 2B, the number of the coils is 12.

The number (M) of the coils (C) satisfies the following Relation 1.

$$M = N \times L \qquad \text{Relation 1}$$

For example, L is 3 or more and 12 or less. L is a multiple of 3. L is the number of the coils (C) on the first flexible substrate (22-1). The number of the coils (C) on the first flexible substrate (22-1) and the number of the coils on the second flexible substrate (22-2) are equal to each other.

The multiple coils (C) formed on the flexible substrate 22 are simultaneously formed. For example, the multiple coils (C) are formed on the flexible substrate 22 using a common alignment mark. Therefore, positions of the coils (C) are related to each other.

Figure 1C:
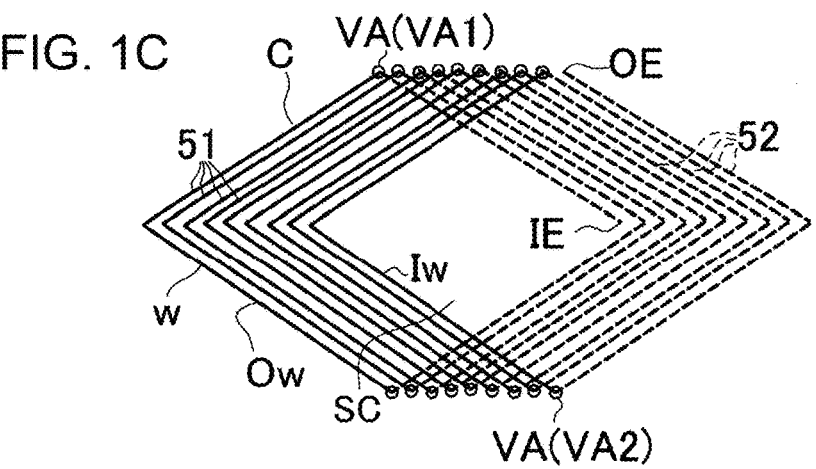
FIG. 1C is a plan view of wirings according to an embodiment of the present invention.

FIG. 1C illustrates an example of a coil (C). The coil (C) is formed of a center space (SC) and wirings (w) surrounding the center space (SC). The wirings (w) have an outer end (OE) and an inner end (IE). The wirings (w) are formed between the outer end (OE) and the inner end (IE). The wirings (w) forming the coil (C) are formed in a spiral shape.

As illustrated in FIG. 1C, the wirings (w) are formed by multiple top wirings 51, multiple bottom wirings 52, and multiple via conductors (VA). The top wirings 51 are formed on the first surface (F). The bottom wiring 52 are formed on the second surface (S). The via conductors (VA) penetrate the flexible substrate 22. The top wirings 51 and the bottom wirings 52 are connected via the via conductors (VA). One top wiring 51, one bottom wiring 52 and one via conductor (VA) form substantially one turn of the coil. Of the wirings (w) forming one turn, the top wiring 51 is close to the one-end (22L) and the bottom wiring 52 is close to the other-end (22R). The multiple via conductors (VA) are divided into first via conductors (VA1) and second via conductors (VA2). The first via conductors (VA1) are close to the upper side (22LU) and the second via conductors (VA2) are close to the lower side (22LB). The top wirings 51, the bottom wirings 52, and the via conductors (VA) are connected in the order of a top wiring 51, a second via conductor (VA2), a bottom wiring 52, and a first via conductor (VA1). Wirings (w) forming adjacent turns are connected via the first via conductors (VA1).

Figure 1D:
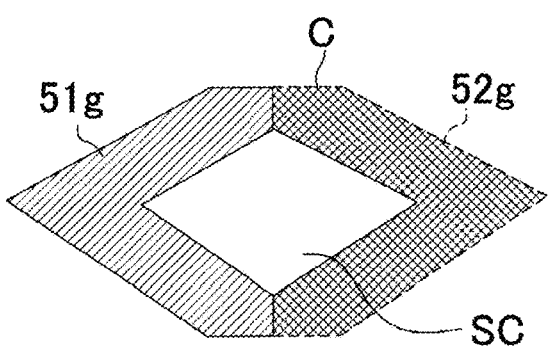
FIG. 1D is a plan view of a coil according to an embodiment of the present invention.

In FIG. 1D, the wirings (w) are grouped. By grouping the top wirings 51, a top wiring group (51g) is formed. By grouping the bottom wirings 52, a bottom wiring group (52g) is formed. The coils (C) in FIGS. 2A and 2B are drawn using the top wiring groups (51g) and the bottom wiring groups (52g).

The coils (C) of the embodiment are formed using a printed wiring board technology. The wirings (w) forming the coils (C) are formed by plating. Or, the wirings (w) forming the coils (C) are formed by etching a copper foil. The wirings (w) forming the coils (C) are formed using a semi-additive method, an M-Sap method, or a subtractive method.

The wirings (w) forming the coils (C) are formed using a printed wiring board technology. Therefore, a cross-sectional shape of each of the wirings (w) is substantially rectangular. According to the embodiment, the space factor of the coils can be increased.

In FIGS. 2A and 2B, the 12 coils (C) are formed from the one-end (22L) to the other-end (22R). The coils (C) include U-phase coils (CU), V-phase coils (CV), and W-phase coils (CW). The U-phase coils (CU), the V-phase coils (CV), and W-phase coil (CW) are in the order of a U-phase coil (CU), a V-phase coil (CV), and a W-phase coil (CW). The coil (C) closest to the one-end (22L) is a U-phase coil (CU).

The coils (C) from the first coil (C1) to the sixth coil (C6) are formed on the first flexible substrate (22-1). The coils (C) from the seventh coil (C7) to the twelfth coil (C12) are formed on the second flexible substrate (22-2).

Figure 3C:
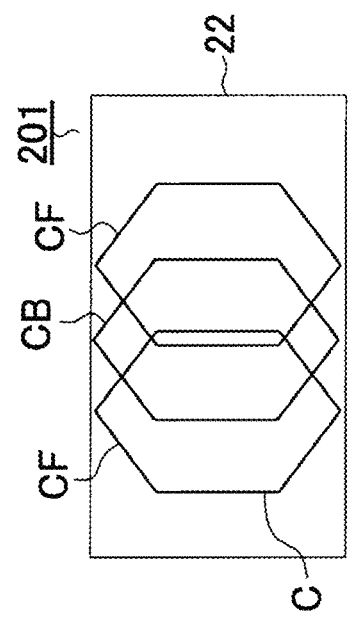
FIG. 3C is a schematic diagram of a coil substrate according to a modified embodiment of the embodiment.
Figure 3A:
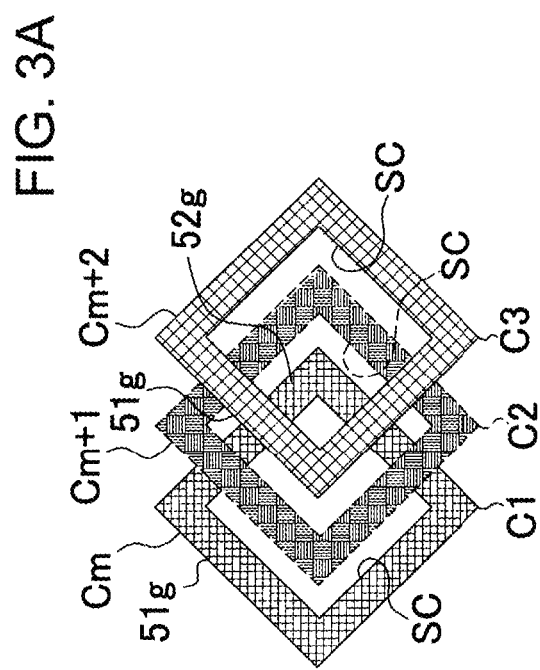
FIG. 3A is a schematic diagram illustrating overlapping of coils according to an embodiment of the present invention.

FIG. 3A illustrates overlapping of the m-th coil (Cm), the (m+1)-th coil (Cm+1), and the (m+2)-th coil (Cm+2). The number m is an integer equal to or greater than 1. When m is 1, the m-th coil (Cm) is the first coil (C1), the (m+1)-th coil (Cm+1) is the second coil (C2), and the (m+2)-th coil (Cm+2) is the third coil (C3). In the example of FIG. 3A, m is 1.

The bottom wiring group (52g) of the m-th coil (Cm) is positioned below the center space (SC) of the (m+1)-th coil (Cm+1), and the top wiring group (51g) of the (m+2)-th coil (Cm+2) is positioned on the center space (SC) of the (m+1)-th coil (Cm+1). In FIG. 3A, an outer periphery of the center space (SC) of the (m+1)-th coil (Cm+1) is drawn using a dotted line. A density of the wirings (w) forming the coils (C) can be increased. A space factor of the coils (C) can be increased. A torque of the motor can be increased.

Figure 3B:
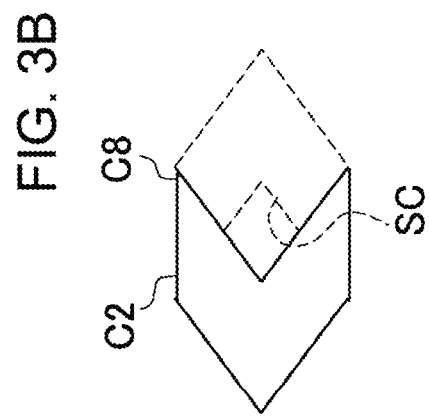
FIG. 3B is a schematic diagram illustrating overlapping of a coil on a first flexible substrate and a coil on a second flexible substrate according to an embodiment of the present invention.

In the embodiment, the number of windings (N) is 2. The motor coil substrate 20 of the embodiment is illustrated in FIG. 1B. FIG. 3B is a projection view of a part of the motor coil substrate 20. Therefore, in FIG. 3B, the coils (C) on the second flexible substrate (22-2) and the coils (C) on the first flexible substrate (22-1) overlap.

By winding the coil substrate 201, as illustrated in FIG. 3B, the center space (SC) of a coil (C) formed on the second flexible substrate (22-2) is positioned on the center space (SC) of a coil (C) formed on the first flexible substrate (22-1). The center space (SC) of a U-phase coil (CU) formed on the second flexible substrate (22-2) is positioned on the center space (SC) of a U-phase coil (CU) formed on the first flexible substrate (22-1). The center space (SC) of a V-phase coil (CV) formed on the second flexible substrate (22-2) is positioned on the center space (SC) of a V-phase coil (CV) formed on the first flexible substrate (22-1). The center space (SC) of a W-phase coil (CW) formed on the second flexible substrate (22-2) is positioned on the center space (SC) of a W-phase coil (CW) formed on the first flexible substrate (22-1). For example, the center space of the (m+3k)-th coil (C) is positioned on the center space (SC) of the m-th coil (C). The (m+3k)-th coil (C) is positioned on the m-th coil (C). As illustrated in FIG. 3B, the m-th coil (C) and the (m+3k)-th coil (C) substantially overlap. k is an integer equal to or greater than 1. k is desirably 1 or 2. k and L satisfy the following Relation 2.

$$k = L/3 \qquad \text{Relation 2}$$

In the embodiment, k is 2. Therefore, the center space of the seventh coil (C7) is positioned on the center space (SC) of the first coil (C1). The center space of the eighth coil (C8)

is positioned on the center space (SC) of the second coil (C2). The center space of the ninth coil (C9) is positioned on the center space (SC) of the third coil (C3). The center space of the tenth coil (C10) is positioned on the center space (SC) of the fourth coil (C4). The center space of the eleventh coil (C11) is positioned on the center space (SC) of the fifth coil (C5). The center space of the twelfth coil (C12) is positioned on the center space (SC) of the sixth coil (C6). The first coil (C1) and the seventh coil (C7) overlap. Similarly, the m-th coil (C) and the (m+3k)-th coil (C) overlap.

When L is 3 and k is 1, the coils (C) from the first coil (C1) to the third coil (C3) are formed on the first flexible substrate (22-1). The coils (C) from the fourth coil (C4) to the sixth coil (C6) are formed on the second flexible substrate (22-2). The center space of the fourth coil (C4) is positioned on the center space (SC) of the first coil (C1). The first coil (C1) and the fourth coil (C4) overlap. Similarly, the m-th coil (C) and the (m+3k)-th coil (C) overlap.

When L is 12 and k is 4, the coils (C) from the first coil (C1) to the twelfth coil (C12) are formed on the first flexible substrate (22-1). The coils (C) from the thirteenth coil (C13) to the twenty-fourth coil (C24) are formed on the second flexible substrate (22-2). The center space of the thirteenth coil (C13) is positioned on the center space (SC) of the first coil (C1). The first coil (C1) and the thirteenth coil (C13) overlap. Similarly, the m-th coil (C) and the (m+3k)-th coil (C) substantially overlap.

Each of the first flexible substrate (inner peripheral flexible substrate) (22-1) and the second flexible substrate (outer peripheral flexible substrate) (22-2) has a length of substantially one winding. There is no coil (C) that extends from the first flexible substrate (22-1) to the second flexible substrate (22-2) across a boundary between the first flexible substrate (22-1) and the second flexible substrate (22-2). There is no coil (C) that straddles the first flexible substrate (22-1) and the second flexible substrate (22-2).

The second flexible substrate (22-2) is wound around the first flexible substrate (22-1). Therefore, a step is likely to occur between the first flexible substrate (22-1) and the second flexible substrate (22-2). A step is likely to occur near the boundary between the first flexible substrate (22-1) and the second flexible substrate (22-2). However, in the embodiment, a coil (C) is not formed on a step. There are no wirings (w) that form a coil (C) on a step. Therefore, the coil substrate 201 can be easily wound. Connection reliability of the wirings (w) can be increased. A step does not occur. Or, a height of a step can be reduced. Roundness of a cross section of the motor coil substrate 20 can be increased. Eccentricity is unlikely to occur when the motor coil substrate 20 rotates.

Among the coils (C) formed on the first flexible substrate (22-1), the coil (C) closest to the other-end (22R) is the q-th coil (Cq). Then, among the coils (C) formed on the second flexible substrate (22-2), the coil (C) closest to the one-end (22L) is the (q+1)-th coil (Cq+1). The bottom wirings 52 of the (q−1)-th coil (Cq−1) are positioned below the center space (SC) of the q-th coil (Cq). However, the top wirings 51 of (q+1)-th coil (Cq+1) are not positioned on the center space (SC) of the q-th coil (Cq).

The top wirings 51 of the (q+2)-th coil (Cq+2) are positioned on the center space (SC) of the (q+1)-th coil (Cq+1). However, the bottom wirings 52 of the q-th coil (Cq) are not positioned below the center space (SC) of the (q+1)-th coil (Cq+1). The q-th coil (Cq) and the (q+1)-th coil (Cq+1) do not overlap. There is a gap between the q-th coil (Cq) and the (q+1)-th coil (Cq+1). The q-th coil (Cq) and the (q+1)-th coil (Cq+1) are separated.

In the example of FIGS. 2A and 2B, the q-th coil (Cq) is the sixth coil (C6), and the (q+1)-th coil (Cq+1) is the seventh coil (C7). The sixth coil (C6) and the seventh coil (C7) do not overlap. The sixth coil (C6) and the seventh coil (C7) are separated. There is a gap between the sixth coil (C6) and the seventh coil (C7).

Modified Embodiments

FIG. 3C illustrates a part of a coil substrate 201 according to a modified embodiment of the embodiment. FIG. 3C illustrates three coils (C) on the first flexible substrate (22-1). The embodiment and the modified embodiment of the embodiment are similar. In FIG. 3C, the coils (C) are drawn using wiring groups. Differences between the embodiment and the modified embodiment are described below.

The wirings (w) that form the coils (C) are different between the embodiment and the modified embodiment. In the embodiment, the coils (C) each have the top wirings 51 and the bottom wirings 52. In contrast, the coil substrate 201 of the modified embodiment of the embodiment has coils (upper coils) (CF) that are formed only by top wirings 51, and coils (lower coils) (CB) that are formed only by bottom wirings 52. The upper coils (CF) are each formed by a center space (SC) and top wirings 51 formed around the center space (SC). The lower coils (CB) are each formed by a center space (SC) and bottom wirings 52 formed around the center space (SC).

The upper coils (CF) and the lower coils (CB) are alternately positioned. The odd-numbered coils are the upper coils (CF). The upper coils (CF) can be referred to as odd coils. The even-numbered coils are the lower coils (CB). The lower coils (CB) can be referred to as even coils.

The top wirings 51 forming the (2p−1)-th coil (C) and the top wirings 51 forming the (2p+1)-th coil (C) are positioned on the center space of the 2p-th coil (C).

The bottom wirings 52 forming the 2p-th coil (C) and the bottom wirings 52 forming the (2p+2)-th coil (C) are positioned below the center space of the (2p+1)-th coil (C).

The motor coil substrate 20 of the modified embodiment of the embodiment has the first flexible substrate (22-1) and the second flexible substrate (22-2). Similar to the embodiment, the motor coil substrate 20 of the modified embodiment does not have a coil (C) on a step. There is no coil (C) that straddles the first flexible substrate (22-1) and the second flexible substrate (22-2).

FIG. 1 of Japanese Patent Application Laid-Open Publication No. 2002-78264 illustrates an insulating film and coils on the insulating film. In Japanese Patent Application Laid-Open Publication No. 2002-78264, the coils are formed on one side of the insulating film. Therefore, according to the technology of Japanese Patent Application Laid-Open Publication No. 2002-78264, it is thought that a space factor of the coils is low.

A coil substrate according to one aspect of the present invention includes: a flexible substrate having a first surface and a second surface on an opposite side with respect to the first surface; and multiple coils formed on the flexible substrate. The coils are positioned substantially in a raw. The coils are each formed by a center space and wirings surrounding the center space. The wirings forming the coils are formed by wirings (top wirings) on the first surface, wirings (bottom wirings) on the second surface, and via conductors that penetrate the flexible substrate and connect the top wirings and the bottom wirings. The bottom wirings of the m-th coil are positioned below the center space of the (m+1)-th coil, and the top wirings of the (m+2)-th coil are positioned on the center space of the (m+1)-th coil.

A coil substrate according to another aspect of the present invention includes: a flexible substrate having a first surface and a second surface on an opposite side with respect to the first surface; and multiple coils formed on the flexible substrate. The coils are positioned substantially in a raw. The coils are each formed by a center space and wirings surrounding the center space. The coils include 2p-th coils (even coils) and (2p−1)-th coils (odd coils). The wirings forming the odd coils are formed by only wirings (top wirings) on the first surface. The wirings forming the even coils are formed by only wirings (bottom wirings) on the second surface. The top wirings of the (2p−1)-th coil and the top wirings of the (2p+1)-th coil are positioned on the center space of the 2p-th coil. The "p" is an integer equal to or greater than 1.

According to an embodiment of the present invention, the wirings forming the coils are formed on both sides of the flexible substrate. On the center space of one coil, the wirings of two adjacent coils are positioned. Or, below the center space of one coil, the wirings of two adjacent coils are positioned. A space factor of the coils can be increased. A density of the wirings forming the coils can be increased. A torque of the motor can be increased.

Obviously, numerous modifications and variations of the present invention are possible in light of the above teachings. It is therefore to be understood that within the scope of the appended claims, the invention may be practiced otherwise than as specifically described herein.

What is claimed is:

1. A motor coil substrate, comprising:
a coil substrate comprising a flexible substrate, and a plurality of coils formed on the flexible substrate such that the coils are positioned substantially in a row and that each of the coils has a center space and a plurality of wirings surrounding the center space,
wherein the plurality of coils is formed such that each of the coils includes a plurality of first wirings formed on a first surface of the flexible substrate, a plurality of second wirings formed on a second surface of the flexible substrate on an opposite side with respect to the first surface, and a plurality of via conductors penetrating through the flexible substrate and connecting the first wirings and the second wirings, the plurality of coils is positioned such that a m-th coil has the plurality of second wirings positioned below the center space of a (m+1)-th coil and that a (m+2)-th coil has the plurality of first coils positioned on the center space of a (m+1)-th coil, where m is an integer equal to or greater than 1, the flexible substrate has a first end and a second end on an opposite side with respect to the first end such that the plurality of coils is formed between the first end and the second end and has a first coil closest to the first end, and the coil substrate is wound such that the center space of a (m+3k)-th coil of the plurality of coils is positioned on the center space of the m-th coil, where k is equal to or greater than 1.

2. The motor coil substrate according to claim 1, wherein the coil substrate is wound such that the center space of a (m+3k)-th coil of the plurality of coils is positioned on the center space of the m-th coil, where k is 1.

3. The motor coil substrate according to claim 1, wherein the coil substrate is wound such that the center space of a (m+3k)-th coil of the plurality of coils is positioned on the center space of the m-th coil, where k is 2.

4. The motor coil substrate according to claim 1, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

5. The motor coil substrate according to claim 4, wherein the flexible substrate is formed such that each of the inner peripheral flexible substrate portion and the outer peripheral flexible substrate portion has a length of substantially one winding.

6. The motor coil substrate according to claim 1, wherein the plurality of coils is formed such that each of the wirings has a substantially rectangular cross-sectional shape.

7. The motor coil substrate according to claim 6, wherein the coil substrate is wound such that the center space of a (m+3k)-th coil of the plurality of coils is positioned on the center space of the m-th coil, where k is 1.

8. The motor coil substrate according to claim 6, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

9. The motor coil substrate according to claim 1, wherein the plurality of coils is formed such that the plurality of wirings comprises plating.

10. The motor coil substrate according to claim 9, wherein the coil substrate is wound such that the center space of a (m+3k)-th coil of the plurality of coils is positioned on the center space of the m-th coil, where k is 1.

11. The motor coil substrate according to claim 10, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

12. The motor coil substrate according to claim 2, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

13. The motor coil substrate according to claim 12, wherein the flexible substrate is formed such that each of the inner peripheral flexible substrate portion and the outer peripheral flexible substrate portion has a length of substantially one winding.

14. The motor coil substrate according to claim 3, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

15. The motor coil substrate according to claim 14, wherein the flexible substrate is formed such that each of the inner peripheral flexible substrate portion and the outer peripheral flexible substrate portion has a length of substantially one winding.

16. The motor coil substrate according to claim 3, wherein the plurality of coils is formed such that each of the wirings has a substantially rectangular cross-sectional shape.

17. The motor coil substrate according to claim 9, wherein the flexible substrate includes an inner peripheral flexible substrate portion and an outer peripheral flexible substrate portion extending from the inner peripheral flexible substrate portion and wound around the inner peripheral flexible substrate portion such that no coil extends from the inner peripheral flexible substrate portion to the outer peripheral flexible substrate portion across a boundary between the inner peripheral flexible substrate portion and the outer peripheral flexible substrate portion.

18. The motor coil substrate according to claim 17, wherein the flexible substrate is formed such that each of the inner peripheral flexible substrate portion and the outer peripheral flexible substrate portion has a length of substantially one winding.

19. The motor coil substrate according to claim 17, wherein the plurality of coils is formed such that each of the wirings has a substantially rectangular cross-sectional shape.

20. The motor coil substrate according to claim 18, wherein the plurality of coils is formed such that each of the wirings has a substantially rectangular cross-sectional shape.

* * * * *